US008867674B2

(12) United States Patent
Yu

(10) Patent No.: US 8,867,674 B2
(45) Date of Patent: Oct. 21, 2014

(54) SCALABLE SATELLITE RECEIVER SYSTEM

(75) Inventor: Tommy Yu, Orange, CA (US)

(73) Assignee: Broadcom Corporation, Irvine, CA (US)

(*) Notice: Subject to any disclaimer, the term of this patent is extended or adjusted under 35 U.S.C. 154(b) by 937 days.

(21) Appl. No.: 12/500,361

(22) Filed: Jul. 9, 2009

(65) Prior Publication Data

US 2010/0303181 A1 Dec. 2, 2010

Related U.S. Application Data

(60) Provisional application No. 61/182,377, filed on May 29, 2009.

(51) Int. Cl.
*H04L 27/06* (2006.01)
*H04H 40/90* (2008.01)
*H04N 7/20* (2006.01)

(52) U.S. Cl.
CPC . *H04H 40/90* (2013.01); *H04N 7/20* (2013.01)
USPC ............ 375/344; 375/316; 375/260; 375/267

(58) Field of Classification Search
CPC ............ H04B 1/707; H04B 1/40; H04B 3/23; H04B 3/32; H04L 25/0266; H04L 25/03343; H04L 7/033; H04L 27/2647; H04L 5/0007
USPC ......... 375/316–352, 130, 140, 219–220, 260, 375/285
See application file for complete search history.

(56) References Cited

U.S. PATENT DOCUMENTS

| 5,737,694 | A  | * | 4/1998 | McMahill et al. | 375/376 |
| 6,845,232 | B2 | * | 1/2005 | Darabi | 375/345 |
| 2003/0016701 | A1 | * | 1/2003 | Hinson | 370/480 |
| 2004/0063416 | A1 | * | 4/2004 | Kuenen et al. | 455/313 |
| 2009/0010370 | A1 | * | 1/2009 | Hamaminato et al. | 375/359 |
| 2009/0168924 | A1 | * | 7/2009 | Gomez et al. | 375/340 |
| 2010/0120386 | A1 | * | 5/2010 | Konstantinos et al. | 455/180.1 |

FOREIGN PATENT DOCUMENTS

WO WO 2006119489 A2 * 11/2006

* cited by examiner

*Primary Examiner* — Sam K Ahn
*Assistant Examiner* — Janice Tieu
(74) *Attorney, Agent, or Firm* — Sterne, Kessler, Goldstein & Fox PLLC

(57) ABSTRACT

A receiver for a multi-channel communication system can include a down-converter device, an analog-to-digital converter (ADC), and a plurality of digital channel selection devices. The down-converter device can be configured to down-convert a plurality of analog signals from the multi-channel communication system to a plurality of corresponding low intermediate frequency (IF) signals. The ADC can be configured to convert the plurality of corresponding low-IF signals to a plurality of digital signals. Further, each digital channel selection device from the plurality of digital channel selection devices can be configured to select a digital signal corresponding to a channel of interest from the plurality of digital signals for further processing.

20 Claims, 14 Drawing Sheets

SCALABLE SATELLITE RECEIVER SYSTEM

CROSS REFERENCE TO RELATED APPLICATION

This application claims the benefit of U.S. Provisional Application No. 61/182,377 (SKGF Ref. No. 2875.3070000; Client Ref. BP 13589), filed May 29, 2009, titled "Scalable Satellite Receiver System," which is incorporated herein by reference in its entirety.

BACKGROUND

1. Field

Embodiments of the present invention generally relate to the field of signal processing in a multi-channel communication system. More specifically, embodiments of the present invention refer to processing one or more satellite channels with a scalable satellite receiver system.

2. Background

A growing portion of television programming is broadcast directly to home receivers via satellite. Satellite television provides a wide array of programming and is broadcasted using several frequency bands (e.g., C-band, Ku-band, and Ka-band), where a particular frequency band can be divided into smaller bands of frequencies or channels. A satellite receiver can decode signals in each channel and pass the decoded signal to a television for viewing. Oftentimes, households desire to view a particular program while recording another program with a recording device. Alternatively, some households desire to view two programs simultaneously (e.g., with a picture-in-picture (PIP) function in television receivers and similar devices), while recording a third program with the recording device. In either case, the satellite receiver processes the channels that correspond to the viewer's programs so that users can have flexibility in their television viewing.

Conventional satellite receivers contain a tuner to process each channel within a frequency band (e.g., C-band, Ku-band, and Ka-band). For instance, in the example above where a user desires to view two programs simultaneously while recording a third program, the conventional satellite receiver requires three tuners to process each channel. The tuner selects and down-converts each desired channel to an intermediate frequency (IF) signal, which is suitable for processing and display on a television or computer monitor. Conventional approaches to the design of tuners employ analog components, such as, for example, fixed-frequency filters, mixers, and local oscillators. Consequently, conventional satellite receivers require extensive hardware, including at least one oscillator and one mixer for each tuner, making the receiver costly for some applications. Furthermore, as the channel capacity of a satellite receiver grows, the receiver consumes more power due to the increase in analog components.

SUMMARY

An apparatus is needed for implementing a scalable satellite receiver system that minimizes circuit area and power consumption. Embodiments of the present invention include a receiver for a multi-channel communication system. The receiver can include a down-converter device, an analog-to-digital converter (ADC), and a plurality of digital channel selection devices. The down-converter device can be configured to down-convert a plurality of analog signals from the multi-channel communication system to a plurality of corresponding low intermediate frequency (IF) signals. The ADC can be configured to convert the plurality of corresponding low-IF signals to a plurality of digital signals. Further, each digital channel selection device from the plurality of digital channel selection devices can be configured to select a digital signal corresponding to a channel of interest from the plurality of digital signals for further processing.

The down-converter device can include a mixer, a filter, and an amplifier. The mixer can receive a local oscillator (LO) input that corresponds to a frequency substantially in the center of a predefined frequency band (e.g., L-band range of frequencies). The mixer can be an I-Q mixer according to one embodiment of the present invention, in which the I-Q mixer is configured to generate a complex-valued analog low-IF signal at the output of the mixer. Further, the filter in the down-converter device can be configured to filter an output of the mixer. The amplifier can be configured to amplify the filtered output of the mixer.

The ADC receives a complex I-Q signal (with an I-signal component and a Q-signal component) from the down-converter device according to an embodiment of the present invention. The ADC is configured to the I- and Q-components of the complex I-Q signal to a digital signal for further processing by the plurality of digital channel selection devices. The digital channel selection device can include a mixer with an input from a direct digital frequency synthesis (DDFS) device. The DDFS device can have a frequency corresponding to the channel of interest according to an embodiment of the present invention.

The receiver can also include an antenna configured to receive the plurality of analog signals and a low-noise block (LNB) converter. The LNB converter can be configured to down-convert the plurality of analog signals received by the antenna to an L-band range of frequencies. The plurality of analog signals residing in the L-band range of frequencies can be subsequently processed by the down-converter device.

Embodiments of the present invention also include a method to process a plurality of analog signals from a multi-channel communication system. The method can include the following steps: down-converting the plurality of analog signals to a plurality of corresponding low intermediate frequency (IF) signals; converting the plurality of corresponding low-IF signals to a plurality of digital signals; and, selecting a digital signal corresponding to a channel of interest from the plurality of digital signals for further processing.

Embodiments of the present invention further include a system to process a plurality of analog signals from a multi-channel communication system. The system can include an antenna to receive the plurality of analog signals, a receiver coupled to the antenna, a processor to control the operation of the receiver, and a memory in communication with the processor to store a plurality of processing instructions for the processor. The processing instructions can include directing the processor to perform the following functions: down-convert the plurality of analog signals to a plurality of corresponding low intermediate frequency (IF) signals; convert the plurality of corresponding low-IF signals to a plurality of digital signals; and, select a digital signal corresponding to a channel of interest from the plurality of digital signals for further processing.

Further features and advantages of the invention, as well as the structure and operation of various embodiments of the present invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

DETAILED DESCRIPTION

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the relevant art that the present invention, as described below, can be implemented in many different embodiments of software, hardware, firmware, and/or the entities illustrated in the figures. Thus, the operational behavior of embodiments of the present invention will be described with the understanding that modifications and variations of the embodiments are possible, given the level of detail presented herein.

Figure 1:
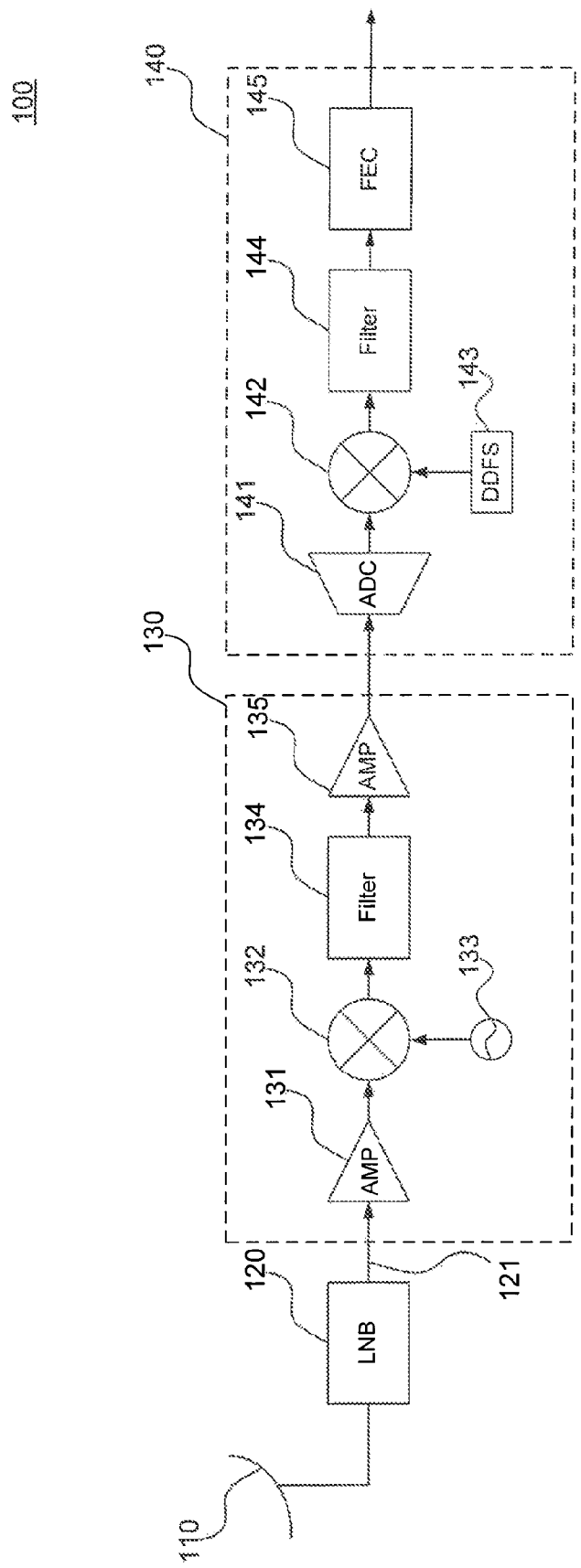
FIG. 1 is an illustration of a conventional satellite receiver.

FIG. 1 is an illustration of a conventional satellite receiver 100. Satellite receiver 100 includes an antenna 110, a low-noise block (LNB) converter 120, a conversion tuner 130, and a digital demodulator 140. For satellite broadcasts, antenna 110 receives analog signals (e.g., RF signals) that correspond to channels in a particular frequency band such as, for example, C-band, Ku-band, and Ka-band. LNB converter 120 receives the analog signals from antenna 110 and down-converts the analog signals to reside in a lower frequency band (e.g., an intermediate frequency). An example of the lower frequency band is an L-band of frequencies (e.g., with a frequency range of 950-2150 MHz).

Conversion tuner 130 includes amplifiers 131 and 135, a mixer 132, a phase lock loop (PLL) 133, and a filter 134. Amplifier 131 receives and amplifies a frequency-converted signal 121 from LNB converter 120. Mixer 132 receives the amplified signal from amplifier 131 and also receives a local oscillator (LO) signal from PLL 133. The frequency of PLL 133 is tuned to the frequency of a desired channel so that the amplified signal from amplifier 131 can be down-converted to a baseband signal for further processing. For example, if the desired channel is 100 MHz, then PLL 133 is tuned to 100 MHz, such that mixer 132 down-converts the frequency of the amplified signal from amplifier 131 to DC.

Filter 134 filters the output of mixer 132 to remove unwanted spurious energy that is above baseband. Alternatively, image rejection techniques may be implemented to reduce undesired signals at the output of mixer 132. For example, a Hartley circuit architecture or Weaver circuit architecture can be incorporated in the design of satellite receiver 100 to further suppress image signals. Image rejection techniques are known to persons skilled in the relevant art. Amplifier 135 amplifies an output from filter 134 for further processing by digital demodulator 140.

Digital demodulator 140 includes an analog-to-digital converter (ADC) 141, a mixer 142, a direct digital frequency synthesis (DDFS) device 143, a filter 144, and a forward error correction (FEC) device 145. ADC 141 samples an analog output from amplifier 135 and translates the analog signal into a digital format. The digital data is then processed by mixer 142, which receives the digital output from ADC 141 at a particular sampling rate. The frequency of DDFS device 143 is tuned to a frequency that reduces the data rate to a more useful value for processing by filter 144. In one example, DDFS device 143 can be a phase accumulator that generates a digitized waveform. Alternatively, other types of DDFS devices can be used.

Filter 144 receives an output from mixer 142. Filter 144 is designed for pulse-shaping purposes and to minimize intersymbol interference in the digital output of mixer 142. Examples of filter 144 are a Nyquist low pass filter and a raised cosine filter, which are both known to persons skilled in the relevant art.

FEC device 145 receives a pulse-shaped digital output from filter 144. FEC device 145 is designed to remove error correction code that is associated with the processed signal. For instance, satellite receiver 100 can receive a signal with error correction code embedded in the signal, where the error correction code allows satellite receiver 100 to detect and correct errors in the received signal without requesting additional information from a transmission source of the signal. Before the processed digital signal can be passed to a television or computer monitor for further processing and subsequent viewing by a user, FEC device 145 removes the error correction code.

The satellite receiver architecture described above can be used to process a single channel from a particular frequency band. That is, if a user has a preference to process three channels at the same time (e.g., a first channel to be viewed by a user, a second channel to be viewed by the user with a PIP-enabled television, and a third channel to be recorded with a recording device), then three conversion tuners (e.g., a conversion tuner 130 for each channel of interest) are required. Conventional satellite receiver 100 does not scale well when there are many channels to be processed, where as the user's preference grows with respect to the number of channels to be simultaneously processed by the satellite receiver, the number of tuners used to process each channel increases accordingly. Many external discrete components may be necessary for analog signal filtering in each tuner, which results in an increase in circuit area.

In addition to circuit area, power consumption also increases as a result of growth in the conventional satellite receiver's capacity to accommodate the growth in number of channels. By using digital frequency converters and filters, which are compact in modern integrated circuit technology and consume less power than their analog counterparts, scalable satellite receiver architecture can be implemented.

Figure 2:
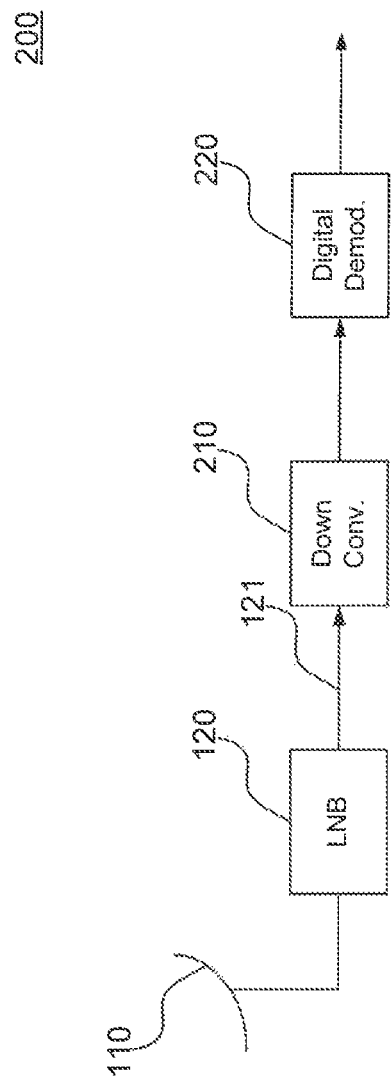
FIG. 2 is an illustration of an embodiment of a satellite receiver.

FIG. 2 is an illustration of a satellite receiver 200 according to an embodiment of the present invention. Satellite receiver 200 includes antenna 110, LNB converter 120, a down-converter 210, and a digital demodulator 220. Antenna 110 and LNB converter 120 operate in a similar manner as described above with respect to FIG. 1.

Satellite receiver 200 is configured to operate in a multi-channel communication system. In particular, satellite receiver 200 employs down-converter 210 to convert an analog input signal from LNB converter 120 to an analog baseband signal. Subsequently, digital demodulator 220 converts the analog baseband signal to a digital signal representative of a channel of interest and then processes the digital information into one or more digital outputs that can be processed by a television or computer monitor (e.g., audio/video signal) for viewing by the user.

Unlike conventional satellite receiver 100 described above with respect to FIG. 1, satellite receiver 200 is a scalable architecture that processes analog signals received by antenna 110. For instance, as noted above with respect to satellite receiver 100, if a user has a preference to process three channels at the same time, then three tuners are required. In other words, a tuner is required to process the analog signal corresponding to each channel. As a result, both the number of analog components and power consumption grow proportionately with the number of channels processed by conventional satellite receiver 100.

On the other hand, the number of analog components and power consumption does not grow proportionately with an increase in the number of channels processed by satellite receiver 200. The number of analog components in down-converter 210 remains the same regardless of the number of channels processed by satellite receiver 200. The number of digital components in digital demodulator 220 may grow as a result of the increase in channels processed by satellite receiver 200. However, the power consumption from the increase in digital components in satellite receiver 200 will be typically far less than the power consumption from an increase in analog components in conventional satellite receiver 100.

Figure 3:
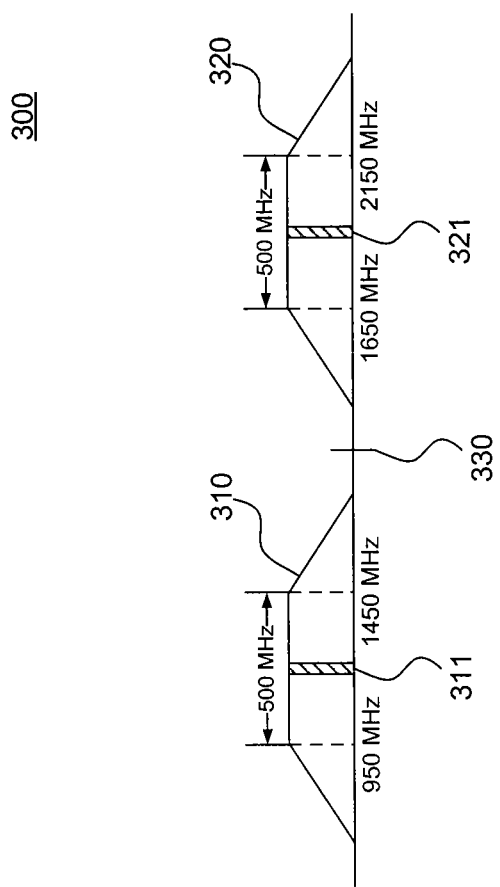
FIG. 3 is an illustration of an example communication system with two frequency bands.

In referring to FIG. 2, LNB converter 120 receives analog signals (e.g., RF signals) from antenna 110 and down-converts the analog signal to reside in an L-band range of frequencies (e.g., 950-2150 MHz) according to an embodiment of the present invention. For explanation purposes, two frequency bands can be defined within the L-band range of frequencies, where each band of frequency contains one or more satellite channels. For example, FIG. 3 is an illustration of an L-band of frequencies 300 with two frequency bands—a lower sideband 310 and an upper sideband 320—that each has a bandwidth of 500 MHz. In an embodiment, lower sideband 310 has a frequency range of 950-1450 MHz and upper sideband 320 has a frequency range of 1650-2150 MHz, where each 500 MHz band of frequencies contains one or more satellite channels with a bandwidth of, for example, 24 MHz each.

The specific ranges of frequencies and bandwidth of frequencies mentioned in the description of satellite receiver 200, and throughout this application, are given for example purposes only and are not meant to be limiting. Those persons skilled in the relevant art will recognize that other ranges of frequencies and bandwidth of frequencies can be used by embodiments of the present invention based on the discussion herein. These other ranges of frequencies and bandwidth of frequencies are within the scope and spirit of the present invention.

Figure 4:
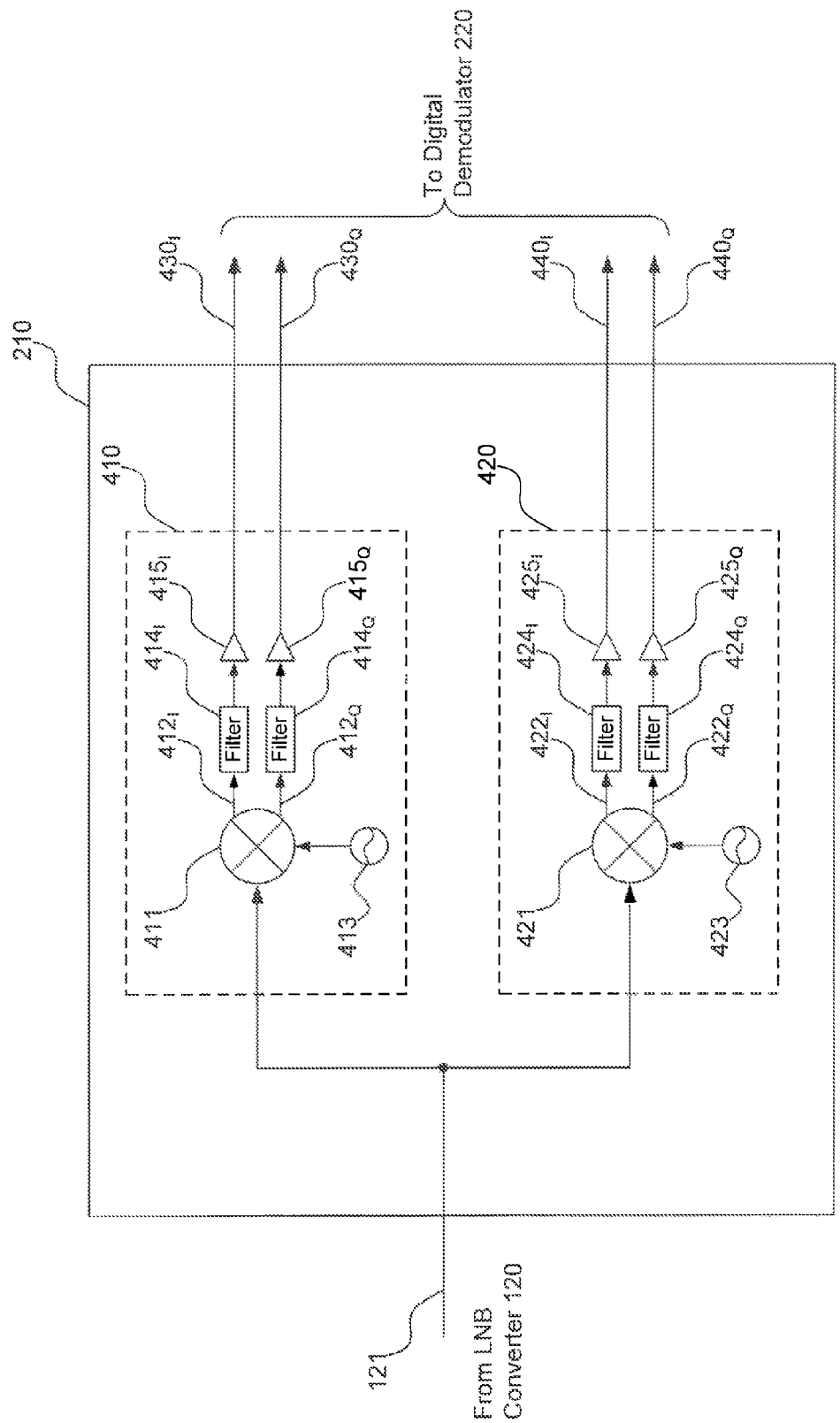
FIG. 4 is an illustration of an embodiment of a down-converter configured to process signals in a communication system with two frequency bands.

FIG. 4 is an illustration of an embodiment of down-converter 210 configured to process signals residing in both lower sideband 310 and upper sideband 320. Down-converter 210 includes a lower band frequency converter 410 and an upper band frequency converter 420.

In an embodiment, lower band frequency converter 410 includes a mixer 411, a PLL 413, filters $414_I$ and $414_Q$, and amplifiers $415_I$ and $415_Q$. Mixer 411 receives frequency-converted signal 121 from LNB converter 120 and converts the analog signal to a baseband signal. In an embodiment, a LO signal of PLL 413 is tuned substantially to the center of lower sideband 310. For example, in reference to FIG. 3, the LO signal of PLL 413 can be tuned to a frequency 311 (e.g., 1200 MHz). A complex-valued analog baseband signal can be generated by mixer 411 as a result of tuning PLL 413 to frequency 311, where the frequency spectrum of the analog baseband signal includes negative as well as positive frequencies. The analog baseband signal is a low-IF signal according to an embodiment of the present invention. In an embodiment, mixer 411 is an I-Q mixer configured to output an I-signal output $412_I$ and a Q-signal output $412_Q$ that correspond to quadrature components, respectively, from the outputs of mixer 411. I-Q mixers are known to persons skilled in the relevant art.

In reference to FIG. 4, filters $414_I$ and $414_Q$ filter signal outputs $412_I$ and $412_Q$, respectively, from mixer 411 to remove unwanted spurious energy that is outside of a predefined passband frequency range. In an embodiment, filters $414_I$ and $414_Q$ can be passband filters configured to pass signals residing in lower sideband 310.

Amplifiers $415_I$ and $415_Q$ receive the analog outputs of filters $414_I$ and $414_Q$, respectively, and amplify the filtered analog signals. Analog outputs $430_I$ and $430_Q$ from amplifiers $415_I$ and $415_Q$, respectively, are then processed by digital demodulator 220.

Upper band frequency converter 420, which includes a mixer 421, a PLL 423, filters $424_I$ and $424_Q$, and amplifiers $425_I$ and $425_Q$, operates in a similar manner as lower band frequency converter 410. Mixer 421 receives frequency-converted signal 121 from LNB converter 120 and converts the analog signal to a baseband signal. In an embodiment, a LO signal of PLL 423 is tuned substantially to the center of upper sideband 320. For example, in reference to FIG. 3, the LO signal of PLL 423 can be tuned to a frequency 321 (e.g., 1900 MHz). In tuning PLL 423 to frequency 321, a complex-valued baseband signal is generated by mixer 421, where the frequency spectrum of the analog baseband signal includes negative as well as positive frequencies. The analog baseband signal is a low-IF signal according to an embodiment of the present invention. In an embodiment, mixer 421 is an I-Q mixer configured to output an I-signal output $422_I$ and a Q-signal output $422_Q$ that correspond to quadrature components, respectively, from the outputs of mixer 421.

Similar to filter $414_I$ and $414_Q$ in lower band frequency converter 410, filters $424_I$ and $424_Q$ filter signal outputs $422_I$ and $422_Q$, respectively, from mixer 421 to remove unwanted spurious energy that is outside of a predefined passband frequency range. In an embodiment, $424_I$ and $424_Q$ can be passband filters configured to pass signals residing in upper sideband 320. Amplifiers $425_I$ and $425_Q$ operate in a similar manner as amplifiers $415_I$ and $415_Q$, described above, and output analog signals $440_I$ and $440_Q$, respectively, to be processed by digital demodulator 220.

Figure 5:
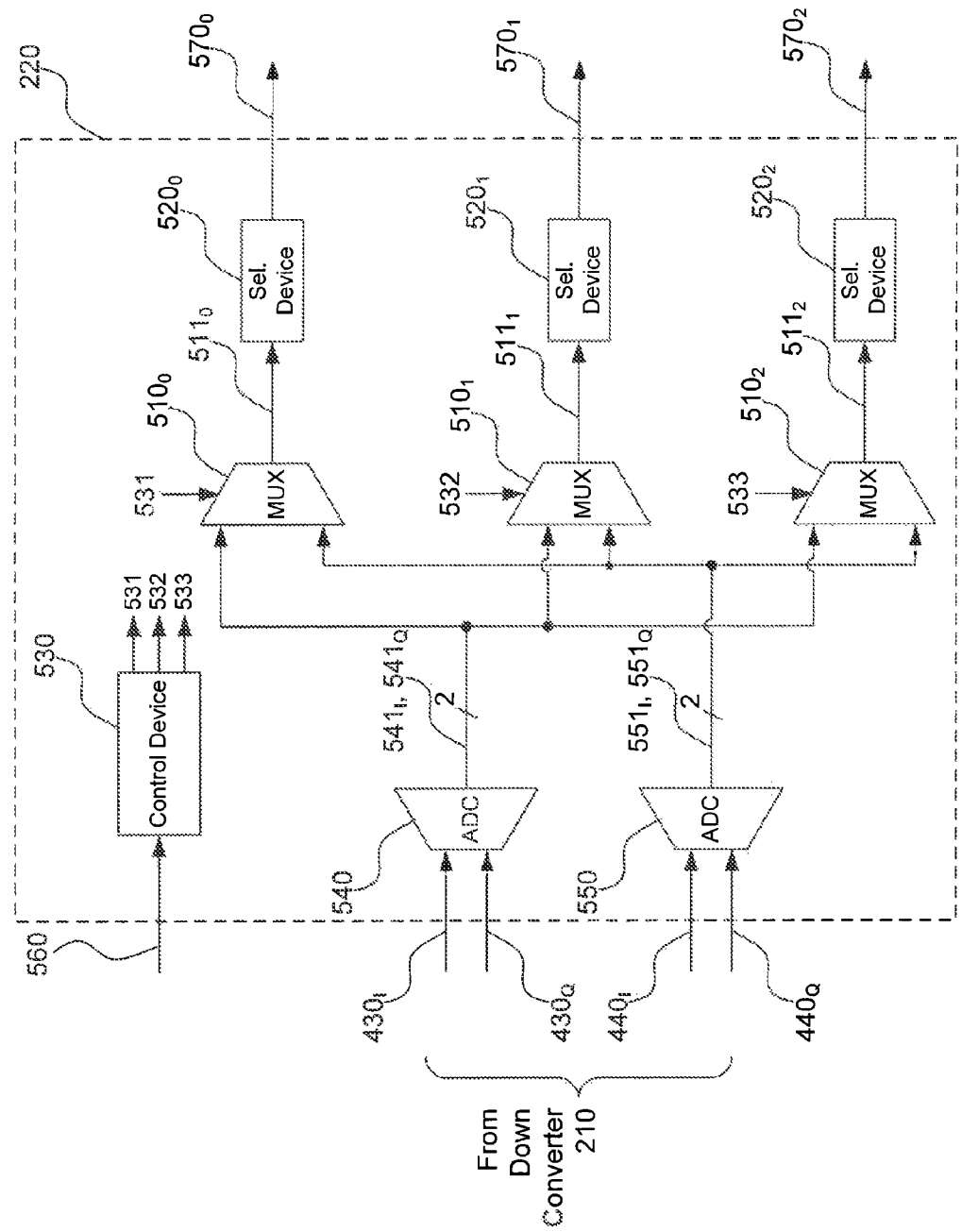
FIG. 5 is an illustration of an embodiment of a digital demodulator.

FIG. 5 is an illustration of an embodiment of digital demodulator 220. In this embodiment, digital demodulator 220 is configured to output three channels $570_0$-$570_2$ and includes multiplexer circuits (MUXes) $510_0$-$510_2$, digital channel selection devices $520_0$-$520_2$, a control device 530, and ADCs 540 and 550. Based on the description herein, a person skilled in the relevant art will recognize that digital demodulator 220 is not limited to outputting three channels and can be configured to output one or more channels.

The example noted above, where a user has a preference to simultaneously process three channels, will be used to facilitate in the explanation of digital demodulator 220. In this example, the user has a preference to view a first channel, to view a second channel with a television having PIP functionality, and to record a third channel with a recording device. These three channels can reside, for example, in L-band of frequencies 300 from FIG. 3.

In FIG. 5, ADC 540 samples analog outputs $430_I$ and $430_Q$ from down-converter 210 and translates the analog signals into digital signals $541_I$ and $541_Q$ according to an embodiment of the present invention. Digital signals $541_I$ and $541_Q$ correspond to a respective digital representation of analog outputs $430_I$ and $430_Q$. Likewise, according to an embodiment of the present invention, ADC 550 samples analog outputs $440_I$ and $440_Q$ from down-converter 210 and translates the analog signals into digital signals $551_I$ and $551_Q$. Digital signals $551_I$ and $551_Q$ correspond to a respective digital representation of analog outputs $440_I$ and $440_Q$. In an embodiment, ADCs 540 and 550 are I-Q ADCs, in which each I-Q ADC includes two analog-to-digital converters—one ADC to convert the analog I-signal into a digital format and another ADC to convert the analog Q-signal into a digital format. Digital signals $541_I$, $541_Q$, $551_I$, and $551_Q$ from ADCs 540 and 550 are passed to MUXes $510_0$-$510_2$.

In an embodiment, control device 530 receives a control signal 560 that indicates whether the first, second, and third channels correspond to signals in lower sideband 310 or upper sideband 320 and outputs respective signals 531-533 for the first, second, and third channels. In processing each of the three channels, MUXes $510_0$-$510_2$ direct digital outputs $541_I$, $541_Q$, $551_I$, and $551_Q$ from ADCs 540 and 550 to an appropriate digital channel selection device $520_0$-$520_2$. For instance, the first channel (to be viewed by the user) may correspond to a signal in lower sideband 310. Signal 531 from control device 530 controls MUX $510_0$ to select digital signals $541_I$ and $541_Q$ to be passed to digital channel selection device $520_0$ (via signal path $511_0$) for further processing. The second channel (to be viewed by the user with a PIP-enabled television) may correspond to a signal in upper sideband 320. Signal 532 from control device 530 controls MUX $510_1$ to select digital signals $551_I$ and $551_Q$ to be passed to digital channel selection device $520_1$ (via signal path $511_1$) for further processing. Lastly, the third channel (to be recorded with a recording device) may correspond to another signal in lower sideband 310. Here, signal 533 from control device 530 controls MUX $510_2$ to select digital signals $541_I$ and $541_Q$ to be passed to digital channel selection device $520_2$ (via signal path $511_2$) for further processing.

Figure 6:
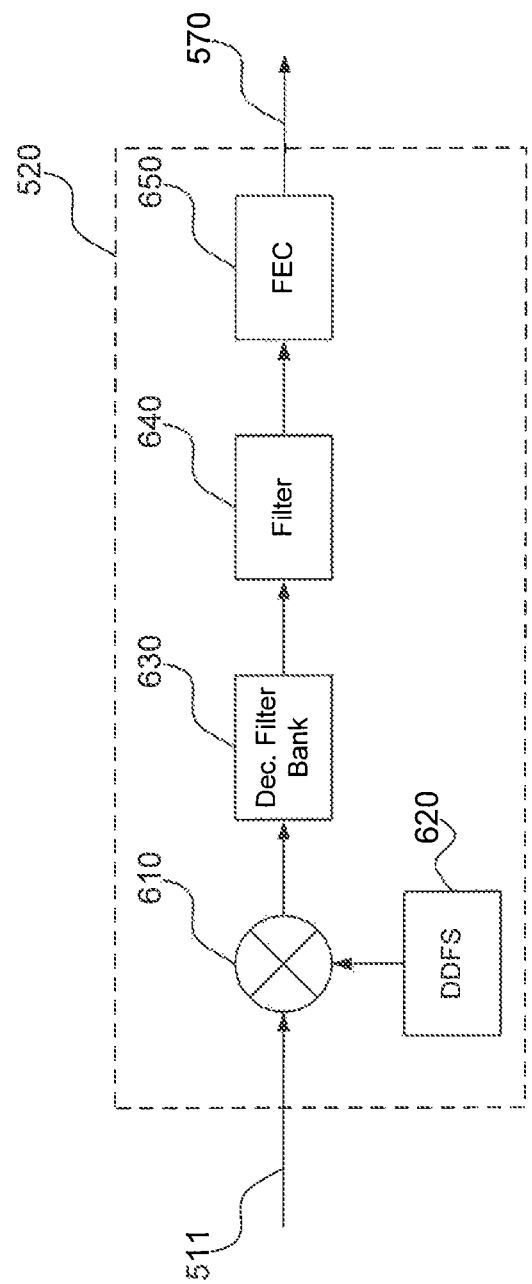
FIG. 6 is an illustration of an embodiment of a digital channel selection device.

FIG. 6 is an illustration of an embodiment of digital channel selection device 520. Digital channel selection device 520 includes a mixer 610, a DDFS device 620, a decimation filter bank 630, a filter 640, and a FEC device 650. Digital signal 511 is processed by mixer 610, where the frequency of DDFS device 620 is tuned to a channel of interest (e.g., frequency of the channel that is sought to be viewed or recorded by the user). In tuning DDFS device 620 to the channel of interest, digital signal 511 can be synchronized in frequency to the carrier of the desired signal (e.g., direct conversion of digital signal 511 to the frequency of the channel of interest).

Decimation filter bank 630 receives the output of mixer 610, down-samples (or decimates) the output of mixer 610, and filters the mixer's output such that a proper frequency response and signal-to-noise ratio are achieved. One purpose of decimation filter bank 630 is to reduce the sampling rate of the digital data at the outputs of ADCs 540 and 550, which can be very high (e.g., 1.2 GHz), to a lower sampling rate so that a system (e.g., television, computer monitor, satellite set top box, etc.) can process the signal. An additional benefit of lowering the sampling rate of the digital data is to reduce cost of processing by the system receiving the channel of interest (e.g., television, computer monitor, satellite set top box, etc.)—the calculation and/or memory required to implement the digital signal processing functions is generally proportional to the sampling rate, so the use of a lower sampling rate typically results in a cheaper implementation.

In reference to FIG. 6, filter 640 receives the digital output from decimation filter bank 630. In an embodiment, filter 640 is a Nyquist filter designed for pulse-shaping purposes and to minimize intersymbol interference in the digital output decimation filter bank 630. FEC device 650 receives the filtered digital output from filter 640 and removes error correction code associated with the digital signal. FEC device 650 operates in a similar manner as FEC device 145 described above with respect to FIG. 1.

In reference to FIG. 5, digital outputs $570_0$-$570_2$ from digital channel selection devices $520_0$-$520_2$, respectively, can be passed to a television, computer monitor, satellite set top box, or similar device, for further processing. In returning to the example, where the user has a preference to simultaneously process three channels, digital output $570_0$ can be used as a channel to be viewed by the user, digital output $570_1$ can be used as a second channel to be viewed by the user via a television with PIP functionality, and digital output $570_2$ can be used as a channel to be recorded with a recording device.

In view of the discussion above with respect to FIGS. 2-6, as a user's preference grows in the number of channels to be processed simultaneously, the architecture of satellite receiver 200 not only occupies a smaller circuit footprint than conventional satellite receiver 100, but also consumes less power than receiver 100. Specifically, as the number of processed channels grows, down-converter 210 in satellite receiver 200 does not increase in size or complexity for the analog processing, whereas satellite receiver 100 would require an additional analog tuner for each additional channel to be processed by the receiver. Even though the number of digital circuits may grow in satellite receiver 200 as a result of an increase in the number of processed channels, integrated digital circuits typically consume far less circuit area than analog components in typical tuner designs. Further, since conventional satellite receiver 100 would require an additional tuner for each additional channel to be processed by the receiver, each additional tuner in satellite receiver 100 would typically consume far more power than the digital circuits used in the signal processing in satellite receiver 200.

Figure 7:
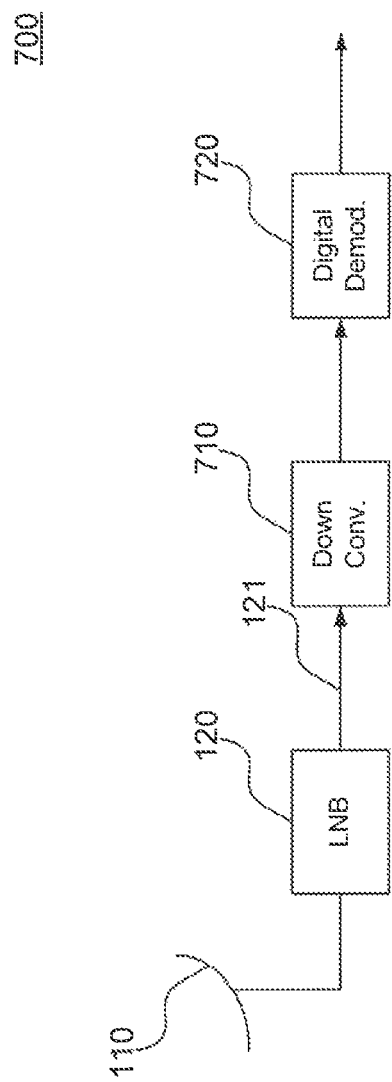
FIG. 7 is an illustration of another embodiment of a satellite receiver.

FIG. 7 is an illustration of an embodiment of a satellite receiver 700. Satellite receiver 700 includes antenna 110, LNB converter 120, a down-converter 710, and a digital demodulator 720. Antenna 110 and LNB converter 120 operate in a similar manner as described above with respect to FIG. 1.

Similar to satellite receiver 200 in FIG. 2, satellite receiver 700 employs down-converter 710 to convert an analog input signal from LNB converter 120 to an analog signal. Subsequently, digital demodulator 720 converts the analog signal to a digital baseband signal and then processes the digital information into one or more digital outputs that can be processed by a television or computer monitor (e.g., audio/video signal) for viewing by the user.

Figure 8:
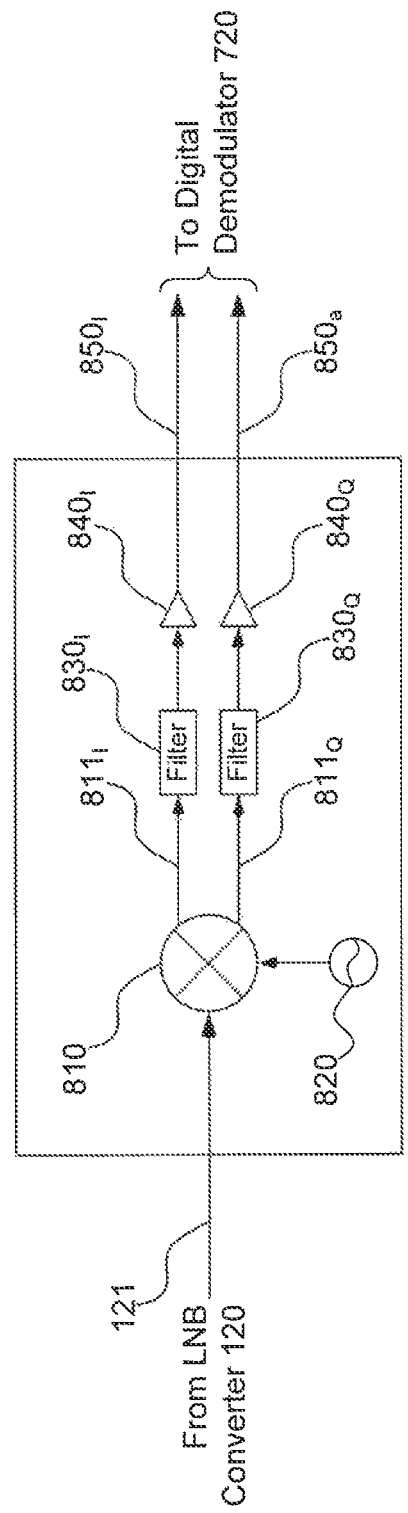
FIG. 8 is an illustration of another embodiment of a down-converter.

FIG. 8 is an illustration of an embodiment of down-converter 710. Down-converter 710 includes a mixer 810, a PLL 820, filters $830_I$ and $830_Q$, and amplifiers $840_I$ and $840_Q$. Down-converter 710 functions in a similar manner as down-converter 210 in FIG. 2. However, unlike the separate processing of signals residing in the lower and upper frequency bands of L-band of frequencies 300 in FIG. 3, down-converter 710 processes signals in both the lower and upper band of frequencies. A person skilled in the relevant art will recognize, based on the description herein, that down-converter 710 can process signals in communication systems that broadcasts channels in one or more frequency bands.

In down-converter 710, mixer 810 receives frequency-converted signal 121 from LNB converter 120 and converts the analog signal to a baseband signal. In an embodiment, a LO signal of PLL 820 is tuned substantially to the center of L-band of frequencies 300. For example, in reference to FIG. 3, the LO signal of PLL 820 can be tuned to a frequency 330 (e.g., 1550 MHz). A complex-valued analog baseband signal can be generated by mixer 810 as a result of tuning PLL 820 to frequency 330, where the frequency spectrum of the analog baseband signal includes negative as well as positive frequencies. The analog baseband signal is a low-IF signal according to an embodiment of the present invention. In an embodiment, mixer 810 is an I-Q mixer configured to output an I-signal output $811_I$ and a Q-signal output $811_Q$ that correspond to quadrature components, respectively, from the outputs of mixer 810. I-Q mixers are known to persons skilled in the relevant art.

In reference to FIG. 8, filters $830_I$ and $830_Q$ operate in a similar manner as filters $414_I$ and $414_Q$ described above with respect to FIG. 4. Further, amplifiers $840_I$ and $840_Q$ operate in a similar manner as amplifiers $415_I$ and $415_Q$ of FIG. 4. Analog outputs $850_I$ and $850_Q$ from amplifiers $840_I$ and $840_Q$, respectively, are processed by digital demodulator 720.

Figure 9:
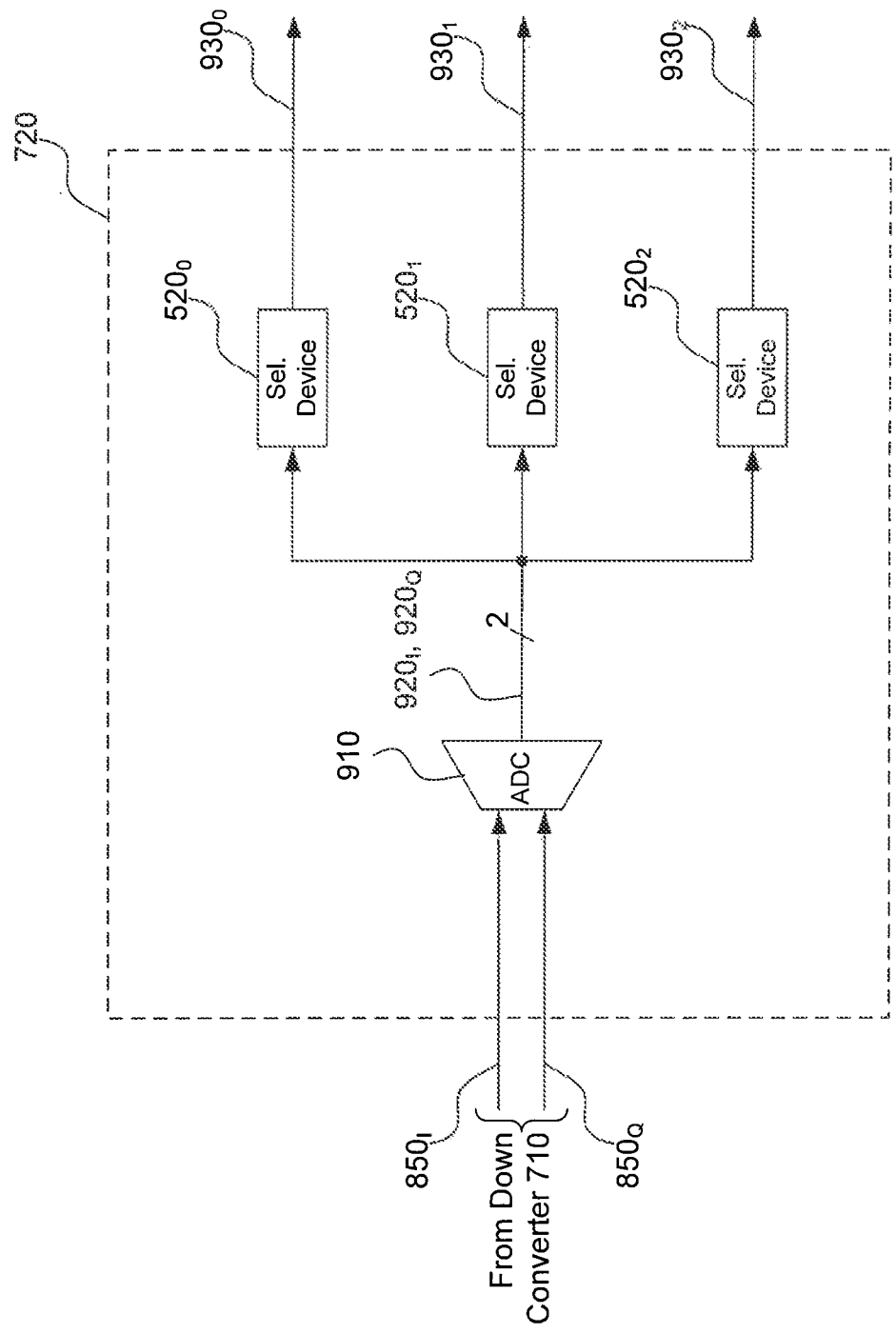
FIG. 9 is an illustration of another embodiment of a digital demodulator.

FIG. 9 is an illustration of an embodiment of digital demodulator 720. In this embodiment, digital demodulator 720 is configured to output three channels $930_0$-$930_2$ and includes ADC 910 and digital channel selection devices $520_0$-$520_2$. Based on the description herein, a person skilled in the relevant art will recognize that digital demodulator 720 is not limited to outputting three channels and can be configured to output one or more channels.

In FIG. 9, ADC 910 samples analog outputs $850_I$ and $850_Q$ from down-converter 710 and translates the analog signals into digital signals $920_I$ and $920_Q$ according to an embodiment of the present invention. Digital signals $920_I$ and $920_Q$ correspond to a respective digital representation of analog outputs $850_I$ and $850_Q$. In an embodiment, ADC 910 can include two analog-to-digital converters—one ADC to convert the analog I-signal into a digital format and another ADC to convert the analog Q-signal into a digital format. Digital signals $920_I$ and $920_Q$ are passed to digital channel selection devices $520_0$-$520_2$ for further processing. Digital channel selection devices $520_0$-$520_2$ function in a similar manner as described above with respect to FIGS. 5 and 6, where digital outputs $930_0$-$930_2$ in FIG. 9 correspond to user-preferred channels.

Figure 10:
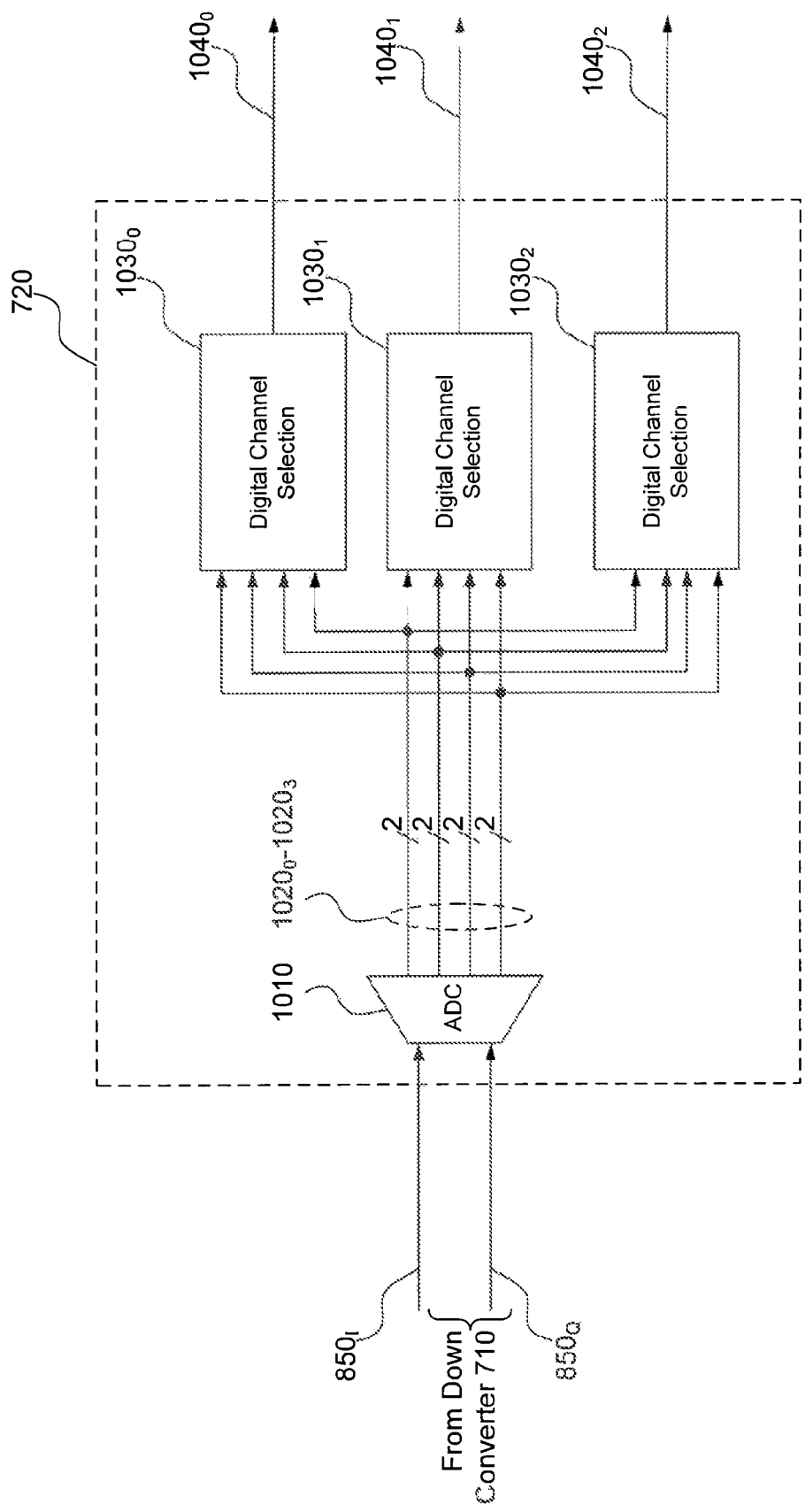
FIG. 10 is an illustration of another embodiment of a digital demodulator.

FIG. 10 is an illustration of another embodiment of digital demodulator 720. In this embodiment, digital demodulator 720 includes an ADC 1010 and digital channel selection devices $1030_0$-$1030_2$.

ADC 1010 samples analog outputs $850_I$ and $850_Q$ from down-converter 710 and translates the analog signals into interleaved digital outputs $1020_0$-$1020_3$. In an embodiment of the present invention, ADC 1010 is a time-interleaved ADC configured to output four interleaved digital signals $1020_0$-$1020_3$, in which each interleaved digital signal 1020 includes a complex-valued I-component and a Q-component (which are not shown in FIG. 10 for simplicity purposes). For instance, ADC 1010 can be designed to sample analog signals $850_I$ and $850_Q$ at a rate of 1.2 GHz, where each digital output $1020_0$-$1020_3$ is configured to output every fourth cycle (e.g., 300 MHz) of the ADC's cycle clock (e.g., 1.2 GHz). Digital outputs $1020_0$-$1020_3$ are passed to digital channel selection devices $1030_0$-$1030_2$ for further processing.

Figure 11:
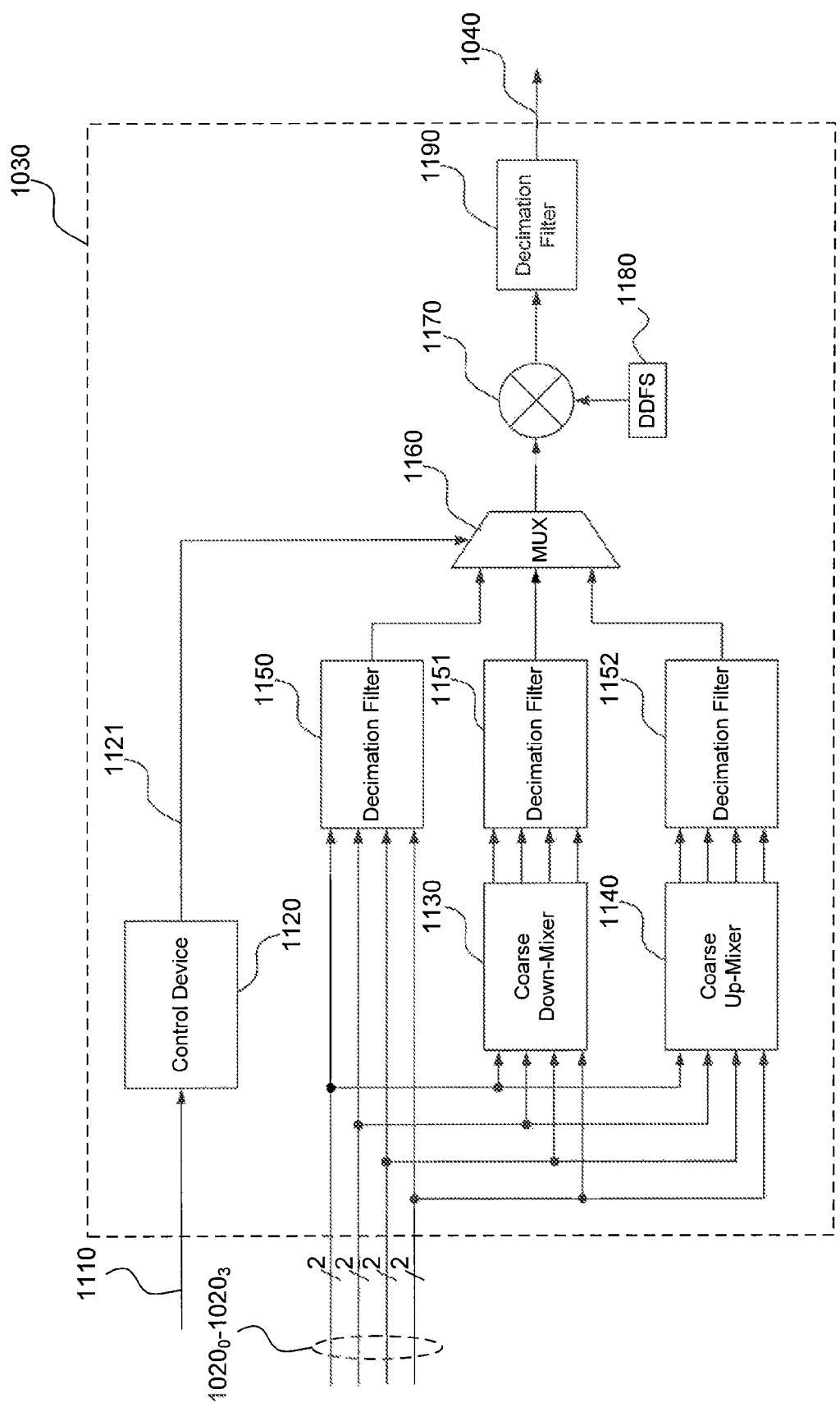
FIG. 11 is an illustration of another embodiment of a digital channel selection device.

FIG. 11 is an illustration of an embodiment of digital channel selection device 1030. Digital channel selection device 1030 includes a control device 1120, a coarse down-mixer 1130, a coarse up-mixer 1140, decimation filters 1150-1152 and 1190, a MUX 1160, a fine mixer 1170, and a DDFS device 1180.

Digital channel selection device 1030 tunes digital signals $1020_0$-$1020_3$ to a desired channel of interest in two stages—a coarse mixing stage and a fine mixing stage. In an embodiment, the coarse mixing stage includes coarse down-mixer 1130, coarse up-mixer 1140, and decimation filters 1150-1152. Further, in an embodiment, the fine mixing stage includes fine mixer 1170, PLL 1180, and decimation filter 1190.

For explanation purposes, L-band range of frequencies 300 from FIG. 3 will be used in the description of digital channel selection device 1030. As described above with respect to FIG. 8, down-converter 710 converts analog signal 121 residing in L-band range of frequencies 300 to a baseband signal and outputs corresponding analog signals $850_I$ and $850_Q$, where the LO signal of PLL 820 can be tuned to a center frequency of, for example, 1550 MHz. In turn, in reference to FIG. 10, digital demodulator 720 receives analog signals $850_I$ and $850_Q$ and outputs one or more corresponding desired channels of interest $1040_0$-$1040_2$. To facilitate in the explanation of digital channel selection device 1030, a desired channel of interest will be assumed to have a baseband signal at 230 MHz.

In reference to FIG. 11, decimation filter 1150 receives interleaved digital signals $1020_0$-$1020_3$, down-samples the interleaved digital signals, and filters the interleaved digital signals such that a proper frequency response and signal-to-noise ratio are achieved. The output of decimation filter 1150 contains, for example, satellite channels in the center region of the input frequency band. For instance, interleaved digital signals $1020_0$-$1020_3$ represents an output of ADC 1010 from FIG. 10, in which ADC 1010 sampled its analog inputs at a rate of 1.2 GHz. Here, decimation filter 1151 can reduce the overall sampling rate of interleaved digital signals $1020_0$-$1020_3$ to, for example, 300 MHz.

Coarse down-mixer 1130 receives interleaved digital signals $1020_0$-$1020_3$ and tunes the digital signals to an intermediate frequency. In an embodiment, coarse down-mixer 1130 tunes digital signals $1020_0$-$1020_3$ to a negative frequency. For instance, coarse down-mixer 1130 can include a complex mixer with a DDFS device as an input to the mixer (e.g., similar to the mixer/DDFS device configuration described above with respect to FIG. 6), where the DDFS device is tuned to −150 MHz. Assuming that the channel of interest has a baseband signal at 230 MHz, the mixer generates a frequency shifted version of the input where the channel of interest is centered at 80 MHz (i.e., 230 MHz+(−150 MHz) =80 MHz), respectively.

In an embodiment, decimation filter 1151 removes the signal with higher frequency (e.g., greater than 150 MHz) at the output of mixer 1130 and passes the signal with lower frequency (e.g., less than 150 MHz) at the output of mixer 1130. The output of the decimation filter 1151 contains, for example, satellite channels in the upper region of the input frequency band. Further, in an embodiment, decimation filter 1151 reduces the sampling rate of interleaved digital signals $1020_0$-$1020_3$. Similar to decimation filter 1150, decimation filter 1151 reduces the overall sampling rate of digital signals $1020_0$-$1020_3$ to, for example, 300 MHz.

Similar to coarse down-mixer 1130, coarse up-mixer 1140 receives interleaved digital signals $1020_0$-$1020_3$ and tunes the digital signals to an intermediate frequency. In an embodiment, coarse up-mixer 1140 tunes digital signals $1020_0$-$1020_3$ to a positive frequency. For instance, coarse up-mixer 1140 can include a complex mixer with a DDFS device as an input to the mixer (e.g., similar to the mixer/DDFS device configuration described above with respect to FIG. 6), where the DDFS device is tuned to +150 MHz. Assuming that the channel of interest has a baseband signal at 230 MHz, the mixer generates a frequency shifted version of the input where the channel of interest is centered at 380 MHz (i.e., 230 MHz+150 MHz=380 MHz), respectively.

In an embodiment, decimation filter 1152 removes the signal with higher frequency (e.g., greater than 150 MHz) at the output of mixer 1140 and passes the signal with lower frequency (e.g., less than 150 MHz) at the output of mixer 1140. The output of the decimation filter 1152 contains, for example, satellite channels in the lower region of the input frequency band. Further, in an embodiment, decimation filter 1152 reduces the sampling rate of interleaved digital signals $1020_0$-$1020_3$. Similar to decimation filters 1150 and 1151, decimation filter 1152 reduces the overall sampling rate of digital signals $1020_0$-$1020_3$ to, for example, 300 MHz.

In reference to FIG. 11, according to an embodiment of the present invention, control device 1120 is configured to determine whether an output of decimation filter 1150, an output of decimation filter 1151, or an output of decimation filter 1152 is passed (via MUX 1160) to fine mixer 1170. As described above with respect to decimation filters 1150-1152, the output of decimation filter 1150 represents a down-sampled baseband digital signal, in which the frequency of the digital signal has not been shifted (e.g., the desired channel of interest maintains a baseband signal at +230 MHz). The output of decimation filter 1151 represents a down-sampled baseband digital signal with a shift in frequency (e.g., the desired channel of interest has a baseband signal at +80 MHz). Similar to the output of decimation filter 1151, the output of decimation filter 1152 represents a down-sampled baseband digital signal with a shift in frequency (e.g., the desired channel of interest has a baseband signal at +380 MHz). In an embodiment, control device 1120 outputs a control signal 1121 to MUX 1160 that indicates which of the down-sampled digital baseband signals from decimation filters 1150-1152 is nearest to DC. For instance, in referring to the example above with the desired channel of interest having a baseband signal at 230 MHz, the output of decimation filter 1151 contains the down-sampled digital baseband signal (i.e., +80 MHz) that is nearest to DC as compared to the output of decimation filter 1150 (i.e., +230 MHz) and the output of decimation filter 1152 (i.e., +380 MHz). In response to control signal 1121, MUX 1160 passes the down-sampled digital baseband signal that is nearest to DC (e.g., digital signal 1161) to fine mixer 1170, according to an embodiment of the present invention.

In an embodiment, fine mixer 1170 and DDFS device 1180 tunes the down-sampled digital baseband signal that is nearest to DC to substantially zero frequency (e.g., direct conversion of digital signal 1161 to DC). For instance, digital signal 1161 can represent the desired channel of interest with a baseband signal at +80 MHz (e.g., output of decimation filter 1151). Here, DDFS device 1180 can be tuned to a frequency of −80 MHz such that fine mixer 1170 generates the frequency shifted version of the input where the desired channel of interest is located at 0 MHz (i.e., 80 MHz+(−80) MHz=0 MHz), respectively.

In an embodiment, decimation filter 1190 removes the signal with higher frequency (e.g., greater than 75 MHz) at the output of fine mixer 1170 and passes the signal with lower frequency (e.g., less than 75 MHz) at the output fine mixer 1170. Further, in an embodiment, decimation filter 1190 reduces the sampling rate of digital signal 1161. Here, decimation filter 1190 can reduce the overall sampling rate of digital signal 1161 to, for example, 150 MHz such that a system (e.g., television, computer monitor, satellite set top box, etc.) can process the digital signal. Therefore, decimation filter 1190 generates a digital output 1040 that can be passed to a television, computer monitor, satellite set top box, or similar device, for further processing.

Figure 12:
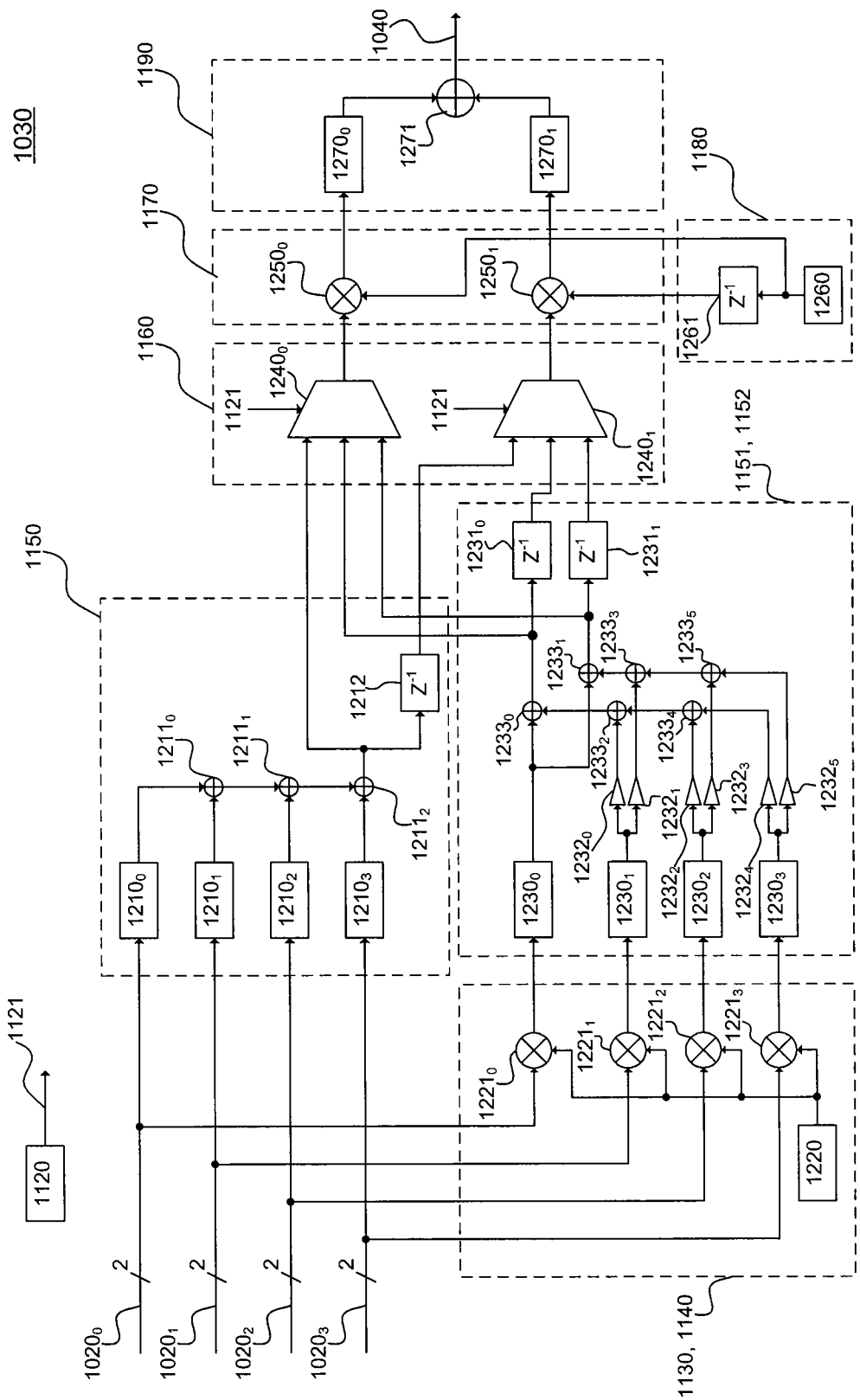
FIG. 12 is an illustration of an embodiment of a circuit schematic of a digital channel selection device.

FIG. 12 is an illustration of an embodiment of a circuit schematic of digital channel selection device 1030. In an embodiment, decimation filter 1150 includes decimation filters $1210_0$-$1210_3$ to receive interleaved digital signals $1020_0$-$1020_3$, respectively. The outputs of digital filters $1210_0$-$1210_3$ are summed by summation circuits $1211_0$-$1211_2$, as shown in FIG. 12, where an output of summation circuit $1211_2$ and a delayed version of the output of summation circuit $1211_2$ (via delay element 1212) are passed to MUX 1160.

In an embodiment of the present invention, coarse down-mixer 1130 and coarse up-mixer 1140 include digital mixers $1221_0$-$1221_3$ and a DDFS device 1220. In an embodiment, digital mixers $1221_0$-$1221_3$ introduce a polarity and frequency shift in digital signals $1020_0$-$1020_3$, where DDFS device 1220 is tuned to an alternating input frequency. For instance, in referring to the example above where the desired channel of interest has a baseband signal at 230 MHz, DDFS device 1220 can generate a stream of alternating unity gain factors (e.g., +1, −1, +1, −1, etc.) with a frequency of 300 MHz. Here, digital mixers $1221_0$-$1221_3$ multiplies respective digital signals $1020_0$-$1020_3$ by the alternating unity gain factors from DDFS device 1220 to generate a sum and difference of its input frequencies (e.g., the baseband signal at 230 MHz and the alternating unity gain factors at 300 MHz). In an embodiment, in alternating the polarity of digital signals $1020_0$-$1020_3$, digital mixers $1221_0$-$1221_3$ modify the most significant bit (MSB) of the digital bit stream entering each respective mixer $1221_0$-$1221_3$ (e.g., modifying a '0' bit in the MSB position of the bit stream to a '1' bit or vice versa). The outputs of digital mixers $1221_0$-$1221_3$ are passed to decimation filters 1151 and 1152.

In reference to FIG. 12, decimation filters 1151 and 1152 include decimation filters $1230_0$-$1230_3$, amplifiers $1232_0$-$1232_5$, summation circuits $1233_0$-$1233_5$, and delay elements $1231_0$ and $1231_1$. Decimation filters $1230_0$-$1230_3$ filter and down-sample their respective digital mixer $1221_0$-$1221_3$ output in accordance with the description above of decimation filters 1151 and 1152. Amplifiers $1232_0$-$1232_5$ amplify the outputs of decimation filters $1230_1$-$1230_3$. Further, the outputs of amplifiers $1232_0$-$1235_5$ are summed, along with the output of decimation filter $1230_0$, by summation circuits $1233_0$-$1233_5$, as illustrated in FIG. 12. An output of summation circuit $1233_0$ and a delayed version of the output of summation circuit $1233_0$ (via delay element $1231_0$) are passed to MUX 1160. Similarly, an output of summation circuit $1233_1$ and a delayed version of the output of summation circuit $1233_1$ (via delay element $1231_1$) are passed to MUX 1160.

In an embodiment of the present invention, MUX 1160 includes MUXes $1240_0$ and $1240_1$, which are both controlled by control signal 1121. MUX $1240_0$ passes a down-sampled digital baseband signal from decimation filter 1150, decimation filter 1151, or decimation filter 1152 that is nearest to DC to fine mixer 1170. Similarly, MUX $1240_1$ passes a delayed version of the down-sampled digital baseband signal that is nearest to DC to fine mixer 1170.

In an embodiment, fine mixer 1170 includes digital mixers $1250_0$ and $1250_1$. Digital mixers $1250_0$ and $1250_1$ receive an input from DDFS device 1180, where DDFS device 1180 is tuned to a frequency such that digital mixers $1250_0$ and $1250_1$ generate a respective digital baseband signal at substantially 0 MHz. In an embodiment, DDFS device 1180 includes a DDFS device 1260 and a delay element 1261. DDFS device 1260 can be tuned to a frequency (e.g., −80 MHz) such that digital mixer $1250_0$ generates a digital baseband signal at substantially 0 MHz. Similarly, in an embodiment, digital mixer $1250_1$ receives a delayed version of the output from DDFS device 1260 (via delay element 1261) such that digital mixer $1250_1$ generates a digital baseband signal at substantially 0 MHz.

In reference to FIG. 12, decimation filter 1190 receives digital mixer outputs from fine mixer 1170 and passes the digital baseband signal at substantially 0 MHz according to an embodiment of the present invention. In an embodiment, decimation filter 1190 includes decimation filters $1270_0$ and $1270_1$ and summation circuit 1271. Decimation filters $1270_0$ and $1270_1$ receive digital outputs from mixers $1250_0$ and $1250_1$, respectively, and passes the digital baseband signal at substantially 0 MHz to summation circuit 1271. Further, decimation filters $1270_0$ and $1270_1$ down-samples the digital baseband signal at substantially 0 MHz to a lower sampling frequency (e.g., 150 MHz) such that a system (e.g., television, computer monitor, satellite set top box, etc.) can process the signal. In an embodiment, summation circuit 1271 combines the filtered and down-sampled digital outputs from decimation filters $1270_0$ and $1270_1$ to generate digital output 1040, which can be passed to a television, computer monitor, satellite set top box, or similar device, for further processing.

Figure 13:
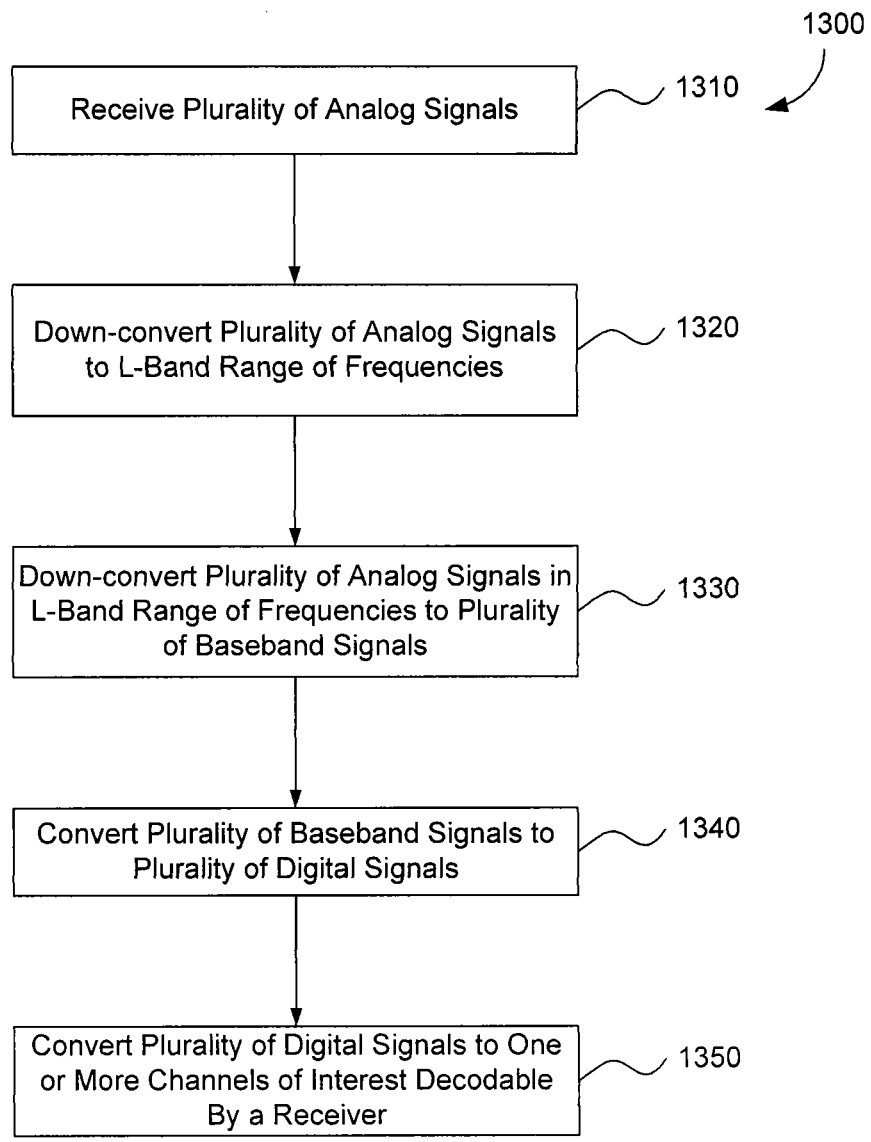
FIG. 13 is an illustration of an embodiment of a method to process a plurality of analog signals from a multi-channel communication system.

FIG. 13 is an illustration of a method 1300 to process a plurality of analog signals from a multi-channel communication system. Method 1300 can occur using, for example, satellite receiver 200 or satellite receiver 700. In step 1310, the plurality of analog signals is received by an antenna. In step 1320, the plurality of signals received by the antenna (in step 1310) is down-converted to an L-band range of frequencies (e.g., 950-2150 MHz). LNB converter 120 from FIG. 1 can be used, for example, to down-convert the plurality of analog signals to the L-band range of frequencies.

In step 1330, the plurality of down-converted analog signals from step 1320 is further down-converted to a plurality of corresponding baseband signals. The baseband signals correspond to low-IF signals according to an embodiment of the present invention. The down-conversion of the analog signals in the L-band range of frequencies to the plurality of corresponding baseband signals can occur using, for example, down-convert 210 from FIG. 2 or down-converter 710 from FIG. 7. In down-converting the plurality of analog signal from step 1320 to the plurality of corresponding baseband signals, the plurality of analog signals in the L-band range of frequencies is mixed with a LO input that corresponds to a frequency substantially in the center of a predefined frequency band (e.g., lower sideband 310, upper sideband 320, or L-band range of frequencies 300) according to an embodiment of the present invention. In an embodiment, the result of the mixing step is a complex-valued analog baseband signal (e.g., complex-valued analog low-IF signal), where the complex-valued analog baseband signal includes a complex I-Q signal with an I-signal component and a Q-signal component. Further, in an embodiment of the present invention, the I- and Q-signal results from the mixing step can be filtered and then amplified.

In step 1340, the plurality of baseband signals (e.g., plurality of low-IF signals) is converted to a plurality of digital signals. In an embodiment, the filtered and amplified I- and Q-signals from step 1340 is converted to a digital signal with an ADC such as, for example, ADC 910 from FIG. 9.

In step 1350, the plurality of digital signals is converted to one or more channels of interest decodable by a receiver. In other words, a digital signal that corresponds to a channel of interest from the plurality of digital signals (from step 1340) is selected for further processing according to an embodiment of the present invention. Step 1350 can occur using, for example, digital channel selection devices $520_0$-$520_2$ from FIG. 5 or digital channel selection device 1030 from FIG. 10.

Figure 14:
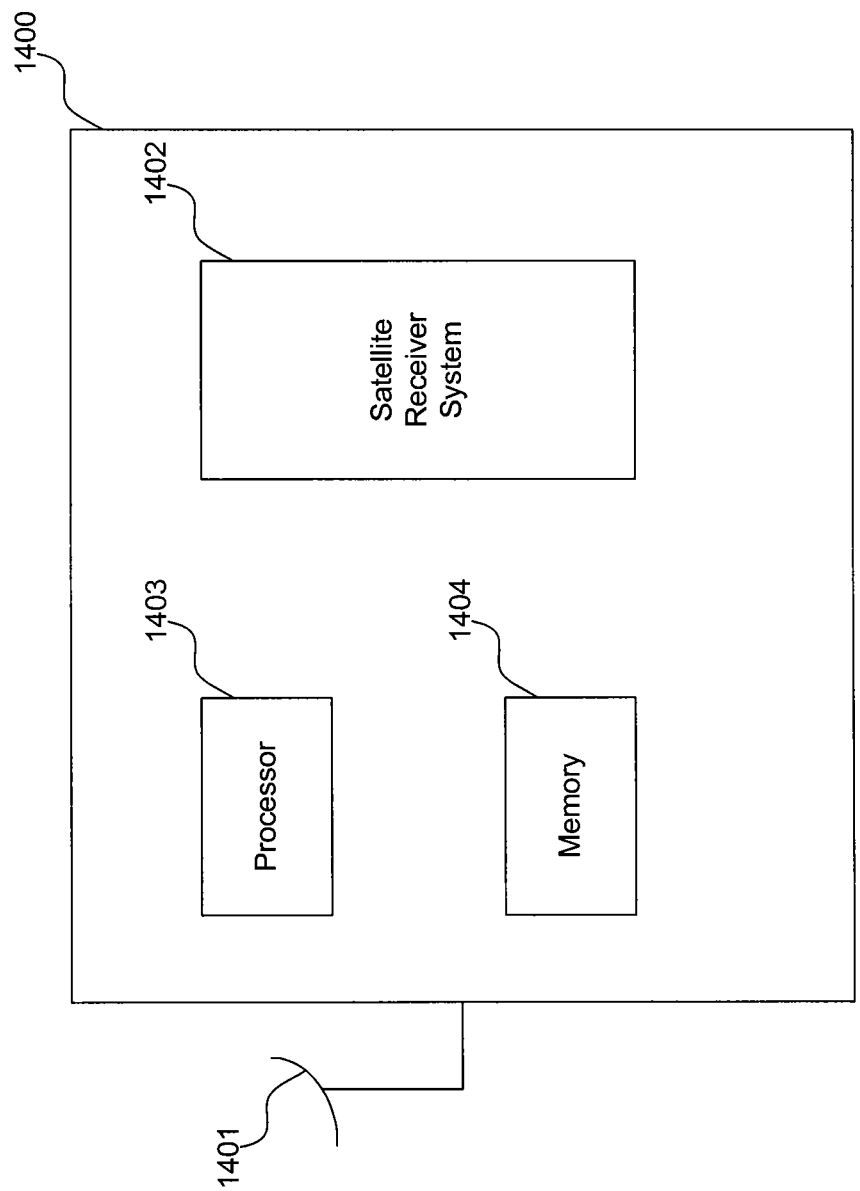
FIG. 14 is an illustration of an embodiment of a system to process a plurality of analog signals from a multi-channel communication system.

FIG. 14 is an illustration of a system 1400 to process a plurality of analog signals from a multi-channel communication system. System 1400 includes an antenna 1401, a satellite receiver system 1402, a processor 1403, and a memory 1404. The representative signal processing functions described herein can be implemented in hardware, software, or some combination thereof. For instance, the signal processing functions can be implemented using computer processors, computer logic, application specific circuits (ASICs), digital signal processors, etc., as will be understood by those skilled in the relevant art based on the discussion given herein. Accordingly, any processor that performs the signal processing functions described herein is within the scope and spirit of the present invention.

Further, the signal processing functions described herein can be embodied by computer program instructions that are executed by a computer processor or any one of the hardware devices listed above. The computer program instructions cause the processor to perform the signal processing functions described herein. The computer program instructions (e.g., software) can be stored in a computer usable medium, computer program medium, or any storage medium that can be accessed by a computer or processor. Such media include a memory device such as a RAM or ROM, or other type of computer storage medium such as a computer disk or CD ROM, or the equivalent. Accordingly, any computer storage medium having computer program code that cause a processor to perform the signal processing functions described herein are within the scope and spirit of the present invention.

In reference to FIG. 14, satellite receiver system 1402 is coupled to antenna 1401 and receives analog signals through antenna 1401. Processor 1403 is coupled to satellite receiver system 1402 and controls the operation of satellite receiver system 1402. Memory 1404 is in communication with processor 1403 and stores processing instructions. In an embodiment of the present invention, these processing instructions direct processor 1403 to perform the following: down-convert the plurality of analog signals to a plurality of corresponding baseband signals; convert the plurality of corresponding baseband signals to a plurality of digital signals; and, convert the plurality of digital signals to one or more channels of interest decodable by a receiver. The plurality of corresponding baseband signals correspond to corresponding low-IF signals according to an embodiment of the present invention. In an embodiment of the present invention, the processing instructions also includes processing instructions for directing processor 1403 to down-convert the plurality of analog signals received by antenna 1401 to an L-band range of frequencies prior to directing processor 1403 to down-convert the plurality of analog signals to the plurality of baseband signals.

In an embodiment, the processing instruction for directing processor 1403 to down-convert the plurality of analog signals to the plurality of corresponding baseband signals (e.g., corresponding low-IF signals) includes processing instructions for directing processor 1403 to mix the plurality of analog signals with a LO input that corresponds to a frequency substantially in the center of a predefined frequency band, filter an output of the mixer, and amplify the filtered output of the mixer. The processing instruction for directing processor 1403 to mix the plurality of analog signals with the LO input includes processing instructions for directing processor 1403 to generate a complex-valued analog baseband signal (e.g., complex-valued analog low-IF signal) at the output of the mixer, where the complex-valued analog baseband signal includes a complex I-Q signal with an I-signal component and a Q-signal component, according to an embodiment of the present invention. Further, in an embodiment, the processing instruction for directing processor 1403 to convert the plurality of baseband signals (e.g., plurality of low-IF signals) to a plurality of digital signals includes processing instruction for directing processor 1403 to convert the I- and Q-components of the complex I-Q signal to a digital signal.

The foregoing description of the specific embodiments will so fully reveal the general nature of the invention that others can, by applying knowledge within the skill of the relevant art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance. Accordingly, the breadth and scope of the present invention should not be limited by any of the above-described exemplary embodiments, but should be defined only in accordance with the following claims and their equivalents.

What is claimed is:

1. A receiver for a multi-channel communication system, comprising:
    a down-converter device configured to down-convert a plurality of analog signals from the multi-channel communication system to a plurality of baseband signals;
    an analog-to-digital converter (ADC) configured to convert the plurality of baseband signals to a plurality of digital signals; and
    a digital channel selection device coupled to the ADC, wherein the digital channel selection device comprises:
        a down mixer configured to tune the plurality of digital signals to a first intermediate frequency (IF) to generate a down-mixed representation of the plurality of digital signals;
        an up-mixer configured to tune the plurality of digital signals to a second IF to generate an up-mixed representation of the plurality of digital signals; and
        a control device configured to select one of the plurality of digital signals, the up-mixed representation of the plurality of digital signals, or the down-mixed representation of the plurality of digital signals based on which representation of the plurality of digital signals is closest to a direct current (DC) frequency for further processing to tune to a channel of interest.

2. The receiver of claim 1, further comprising:
    an antenna configured to receive the plurality of analog signals; and
    a low-noise block (LNB) converter configured to down-convert the plurality of analog signals received by the antenna to an L-band range of frequencies, wherein the plurality of analog signals residing in the L-band range of frequencies are subsequently processed by the down-converter device.

3. The receiver of claim 2, wherein the antenna receives the plurality of analog signals from at least one of a C-band, a Ku-band, a Ka-band of frequencies, or a combination thereof.

4. The receiver of claim 1, wherein the down-converter comprises:
    a mixer with a local oscillator (LO) input that corresponds to a frequency substantially in the center of a predefined frequency band;
    a filter configured to filter an output of the mixer; and
    an amplifier configured to amplify the filtered output of the mixer.

5. The receiver of claim 4, wherein the mixer comprises an in-phase/quadrature-phase (I-Q) mixer configured to generate a complex-valued analog baseband signal at the output of the mixer, wherein the complex-valued analog baseband signal includes a complex I-Q signal with an in-phase signal (I-signal) component and a quadrature-phase signal (Q-signal) component.

6. The receiver of claim 5, wherein the ADC is configured to convert the I-signal and Q-signal components of the complex I-Q signal to a digital signal.

7. The receiver of claim 1, wherein the digital channel selection device comprises a mixer, a direct digital frequency synthesis (DDFS) device, and a decimation filter bank.

8. The receiver of claim 7, wherein the DDFS device comprises an input to the mixer, the input having a frequency that tunes the mixer to the channel of interest.

9. The receiver of claim 7, wherein the decimation filter bank is configured to filter an output of the mixer based on a predefined frequency response and to down-sample the filtered output of the mixer.

10. The receiver of claim 1, wherein the ADC is configured to output a plurality of interleaved digital signals corresponding to the baseband signals.

11. The receiver of claim 1, wherein the digital channel selection device comprises
    a fine mixer configured to tune the selected plurality of digital signals to substantially zero frequency.

12. A method to process a plurality of analog signals from a multi-channel communication system, the method comprising:

down-converting the plurality of analog signals to a plurality of baseband signals;

converting the plurality of baseband signals to a plurality of digital signals; and tuning the plurality of digital signals to a first intermediate frequency (IF) to generate a down-mixed representation of the plurality of digital signals;

tuning the plurality of digital signals to a second IF to generate an up-mixed representation of the plurality of digital signals; and selecting a digital signal corresponding to a channel of interest, wherein the selecting comprises selecting one of the plurality of digital signals, the up-mixed representation of the plurality of digital signals, or the down-mixed representation of the plurality of digital signals based on which representation of the plurality of digital signals is closest to a direct current (DC) frequency.

13. The method of claim 12, further comprising:

receiving the plurality of analog signals with an antenna; and down-converting the plurality of analog signals received by the antenna to an L-band range of frequencies prior to down-converting the plurality of analog signals to the plurality of baseband signals.

14. The method of claim 12, wherein down-converting comprises:

mixing the plurality of analog signals with a local oscillator (LO) input that corresponds to a frequency substantially in the center of a predefined frequency band;

filtering an output of the mixer; and amplifying the filtered output of the mixer.

15. The method of claim 14, wherein mixing comprises generating a complex-valued analog baseband signal at the output of the mixer, wherein the complex-valued analog baseband signal includes a complex in-phase/quadrature-phase (I-Q) signal with an in-phase signal (I-signal) component and a quadrature-phase signal (Q-signal) component.

16. A system to process a plurality of analog signals from a multi-channel communication system, the system comprising:

an antenna;

a receiver coupled to the antenna, wherein the receiver receives the plurality of analog signals through the antenna;

a processor coupled to the receiver, wherein the processor controls one or more operations of the receiver; and a memory in communication with the processor, the memory for storing a plurality of processing instructions for directing the processor to:

down-convert the plurality of analog signals to a plurality of baseband signals;

convert the plurality of baseband signals to a plurality of digital signals; and tune the plurality of digital signals to a first intermediate frequency (IF) to generate a down-mixed representation of the plurality of digital signals;

tune the plurality of signals to a second IF to generate an up-mixed representation of the plurality of digital signals; and select a digital signal corresponding to a channel of interest, wherein the channel of interest is selected from one of the plurality of digital signals, the up-mixed representation of the plurality of digital signals, or the down-mixed representation of the plurality of digital signals based on which representation of the plurality of digital signals is closest to a direct current (DC) frequency.

17. The system of claim 16, further comprising a memory in communication with the processor, the memory for storing a plurality of processing instructions for directing the processor to down-convert the plurality of analog signals received by the antenna to an L-band range of frequencies prior to directing the processor to down-convert the plurality of analog signals to the plurality of baseband signals.

18. The system of claim 16, wherein the instructions for directing the processor to down-convert the plurality of analog signals to the plurality of baseband signals comprise instructions for directing the processor to:

mix the plurality of analog signals with a local oscillator (LO) input that corresponds to a frequency substantially in the center of a predefined frequency band;

filter an output of the mixer; and amplify the filtered output of the mixer.

19. The system of claim 18, wherein the instructions for directing the processor to mix the plurality of analog signals comprise instructions for directing the processor to generate a complex-valued analog baseband signal at the output of the mixer, wherein the complex-valued analog baseband signal includes a complex in-phase/quadrature-phase (I-Q) signal with an in-phase signal (I-signal) component and a quadrature-phase signal (Q-signal) component.

20. The system of claim 19, wherein the instructions for directing the processor to convert the plurality of baseband signals to the plurality of digital signals comprise instructions for directing the processor to convert the I-signal and Q-signal components of the complex I-Q signal to a digital signal.

* * * * *